US011574158B2

(12) United States Patent
Saito

(10) Patent No.: US 11,574,158 B2
(45) Date of Patent: Feb. 7, 2023

(54) INFORMATION PROCESSING METHOD, INFORMATION PROCESSING SYSTEM, AND STORAGE MEDIUM THAT PERFORM PREDETERMINED PROCESSING ON A TARGET REGION IN AN IMAGE BASED ON A TARGET REGION SETTING

(71) Applicant: CANON KABUSHIKI KAISHA, Tokyo (JP)

(72) Inventor: Wataru Saito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/384,183

(22) Filed: Jul. 23, 2021

(65) Prior Publication Data

US 2022/0036148 A1 Feb. 3, 2022

(30) Foreign Application Priority Data

Jul. 29, 2020 (JP) .............................. JP2020-128313

(51) Int. Cl.
 *G06K 15/02* (2006.01)
 *G06K 15/00* (2006.01)

(52) U.S. Cl.
 CPC ....... *G06K 15/1874* (2013.01); *G06K 15/007* (2013.01); *G06K 15/1822* (2013.01); *G06K 15/1877* (2013.01); *G06K 15/1885* (2013.01)

(58) Field of Classification Search
 CPC ........... G06K 15/1874; G06K 15/1877; G06K 15/1885
 See application file for complete search history.

(56) References Cited

U.S. PATENT DOCUMENTS

| 5,450,208 | A  | * | 9/1995  | Murata ..................... G09G 5/28 358/296 |
| 6,129,457 | A  | * | 10/2000 | Thompson, Jr. ... H04N 1/40068 382/266 |
| 8,769,395 | B2 | * | 7/2014  | Boliek .................... H04N 19/46 715/764 |
| 10,366,520 | B2 | * | 7/2019  | Hayakawa .............. G06T 11/60 |
| 10,795,620 | B2 | * | 10/2020 | Hayakawa ............ G06F 3/1208 |
| 10,956,797 | B1 | * | 3/2021  | Chakrabarty ......... G06F 3/1208 |
| 2001/0040699 | A1 | * | 11/2001 | Osawa ..................... H04N 1/40 358/444 |
| 2002/0051022 | A1 | * | 5/2002  | Hosono ................ B41J 2/04551 347/11 |
| 2004/0252340 | A1 | * | 12/2004 | Komagamine ...... H04N 1/3875 358/1.18 |
| 2006/0197963 | A1 | * | 9/2006  | Royal ..................... G06T 11/60 358/1.2 |

(Continued)

FOREIGN PATENT DOCUMENTS

| JP | 2019-047295 A |   | 3/2019 |           |
| JP | 2019047295  A | * | 3/2019 | ........... H04N 21/431 |

*Primary Examiner* — Ted W Barnes
(74) *Attorney, Agent, or Firm* — Venable LLP

(57) ABSTRACT

An information processing method obtains image data representing an image laid out on a page, and sets, in the image, a target region on which to perform predetermined processing to change a pixel count, based on layout information pertaining to a layout of the image on the page. Based on this setting, the predetermined processing is performed on the target region in the image.

19 Claims, 11 Drawing Sheets

(56) References Cited

U.S. PATENT DOCUMENTS

| | | | |
|---|---|---|---|
| 2007/0153042 A1* | 7/2007 | Han | G06K 15/107 347/15 |
| 2009/0148064 A1* | 6/2009 | Schulz | G06T 11/60 382/284 |
| 2009/0164561 A1* | 6/2009 | Ono | H04N 1/00156 715/243 |
| 2011/0032568 A1* | 2/2011 | Takahashi | G06F 3/1239 358/1.15 |
| 2012/0274955 A1* | 11/2012 | Crean | H04N 1/648 358/1.9 |
| 2015/0212854 A1* | 7/2015 | Tsukuda | G06F 9/4881 718/102 |
| 2015/0286444 A1* | 10/2015 | Sinn | G06F 3/1288 358/1.9 |
| 2016/0012322 A1* | 1/2016 | Iwata | G06K 15/4055 358/1.2 |
| 2018/0234559 A1* | 8/2018 | Abe | H04N 1/00196 |
| 2018/0365799 A1* | 12/2018 | Yokomizo | H04N 5/217 |
| 2019/0104222 A1* | 4/2019 | Kunieda | H04N 1/00143 |
| 2019/0124234 A1* | 4/2019 | Perdicaro | H04N 1/387 |
| 2019/0258908 A1* | 8/2019 | Shindo | G06K 15/1874 |
| 2019/0324695 A1* | 10/2019 | Hayakawa | G06F 3/1288 |
| 2020/0074606 A1* | 3/2020 | Fukuoka | H04N 1/3875 |
| 2020/0076963 A1* | 3/2020 | Ishida | G06F 3/1204 |
| 2021/0012456 A1* | 1/2021 | Hashimoto | G06V 20/00 |
| 2021/0012501 A1 | 1/2021 | Saito | |
| 2021/0112175 A1* | 4/2021 | McMahan, Jr. | H04N 1/32149 |
| 2021/0279534 A1* | 9/2021 | Stellbrink | G06F 3/1229 |
| 2021/0311676 A1* | 10/2021 | Natori | G06F 3/1241 |
| 2022/0006918 A1* | 1/2022 | Suzuki | H04N 1/6008 |

\* cited by examiner

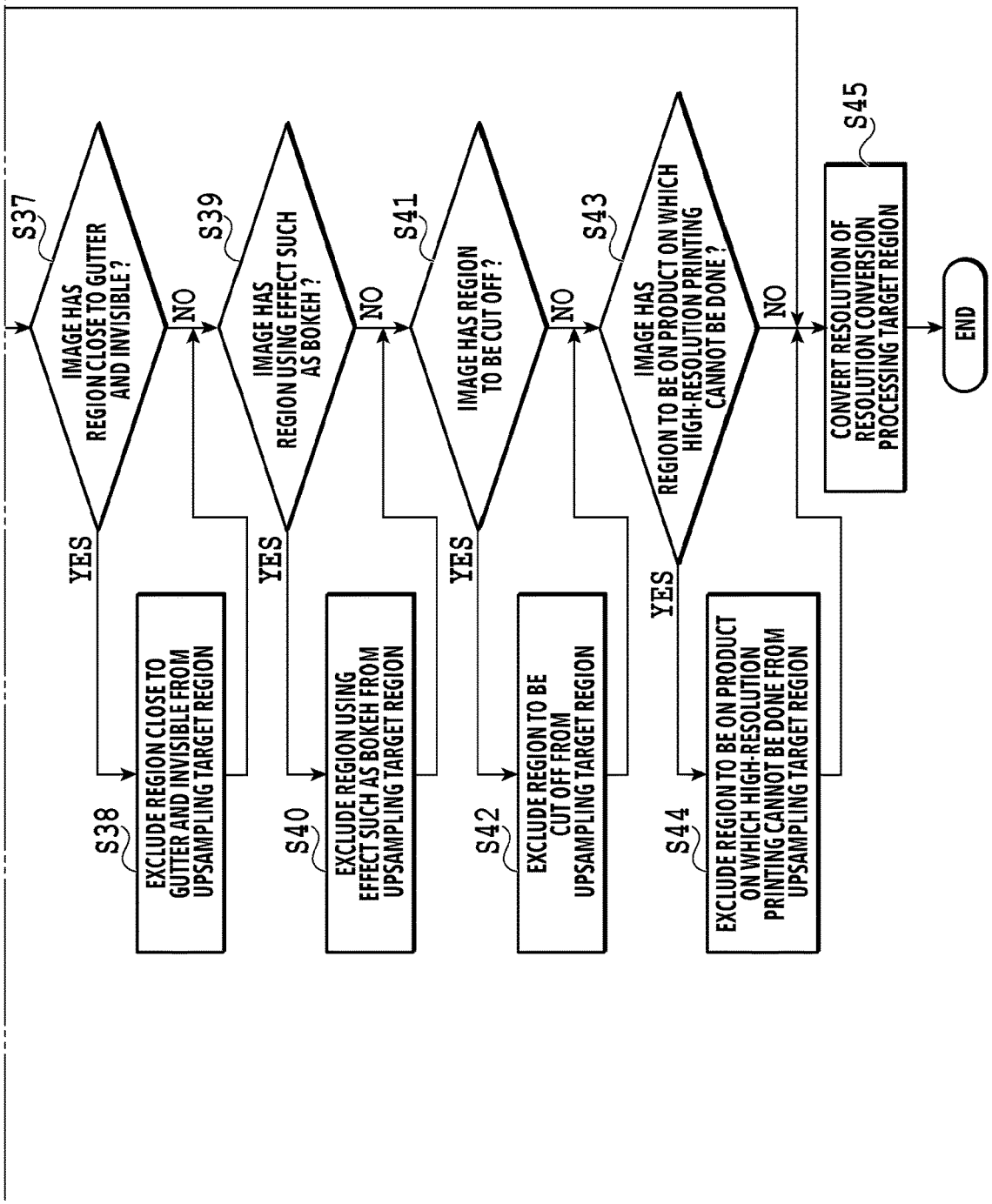

INFORMATION PROCESSING METHOD, INFORMATION PROCESSING SYSTEM, AND STORAGE MEDIUM THAT PERFORM PREDETERMINED PROCESSING ON A TARGET REGION IN AN IMAGE BASED ON A TARGET REGION SETTING

CROSS-REFERENCE TO RELATED APPLICATION

This application claims the benefit of Japanese Patent Application No. 2020-128313 filed Jul. 29, 2020, which is hereby incorporated by reference herein in its entirety.

BACKGROUND OF THE INVENTION

Field of the Invention

A technique disclosed herein relates to an information processing system, an information processing method, and a storage medium for changing the resolution of image data.

Description of the Related Art

There is known a technique for creating a printed matter such as a photo album using image data obtained by an image capturing device such as a digital camera. In recent years, techniques of this type tend to be expected to create printed matters with high definition. To create high-definition printed matters, it is necessary to print them using image data with high pixel counts. A known method for generating image data with high pixel count is image processing called upsampling, which increases the number of pixels in original image data. Also, not only in printing, but also in a case when, e.g., a plurality of images are laid out for display, it may be desirable that they be displayed using image data with high pixel counts.

Japanese Patent Laid-Open No. 2019-47295 discloses an apparatus that performs upconversion to enhance the resolution of an image. Japanese Patent Laid-Open No. 2019-47295 also discloses a method used in the above apparatus for switching image processing to perform on an image depending on the position where the image is displayed.

SUMMARY OF THE INVENTION

For example, there is a case when a plurality of images are laid out and then outputted as a digital representation or as a printed matter. In such a case, depending on, e.g., the layout of the images, the output images may have an image region that catches the eye of a user easily and an image region that does not. In other words, an image may have a portion with a high need for pixel count enhancement and a portion with a low need for pixel count enhancement.

Thus, the present disclosure has an object to provide a technique capable of performing pixel count changing processing on a suitable image region in an image laid out.

A technique of the present disclosure is an information processing method comprising obtaining image data representing an image laid out on a page, setting, in the image, a target region on which to perform predetermined processing to change a pixel count, based on layout information pertaining to a layout of the image on the page, and performing the predetermined processing on the target region in the image based on the setting set in the setting of a target region.

The technique of the present disclosure is capable of performing pixel count changing processing on a suitable image region in an image laid out.

Further features of the present invention will become apparent from the following description of exemplary embodiments with reference to the attached drawings.

BRIEF DESCRIPTION OF THE DRAWINGS

FIG. 7 is a diagram showing a relationship between FIG. 7A and FIG. 7B;

FIGS. 7A and 7B are flowcharts showing the processing in S3 in FIG. 6 in more detail;

DESCRIPTION OF THE EMBODIMENTS

With reference to the drawings, the following describes embodiments of an information processing system and an information processing method according to a technique of the present disclosure. Note that the present embodiments are described taking an example of an information processing system and an information processing method that process image data for an album created using a printing apparatus. It should also be noted that what is meant by the term "resolution" hereafter is not only the number of pixels per unit length in a case when the image is displayed or printed, but also the number of pixels contained in image data. For instance, "resolution conversion processing" is described as processing for changing the number of pixels contained in image data.

First Embodiment (Information Processing System)

Figure 1:
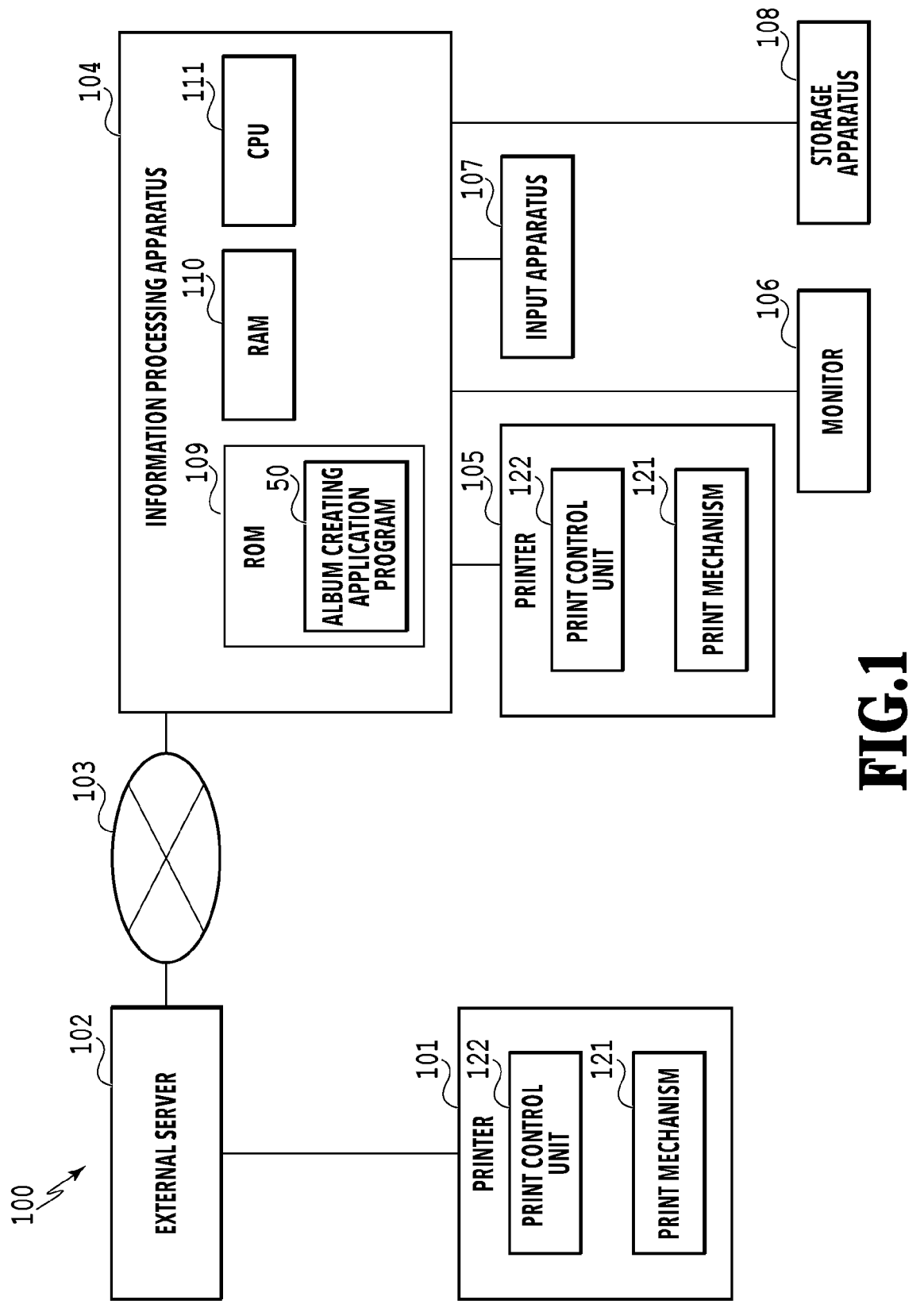
FIG. 1 is a diagram of the configuration of an information processing system.

FIG. 1 is a diagram of the schematic configuration of an information processing system 100 according to a first embodiment. The information processing system 100 of the present embodiment includes printers 101, 105 as printing apparatuses for performing printing processing, an information processing apparatus 104, and an external server 102 communicatively connected to the information processing apparatus 104 via a network 103.

The information processing apparatus 104 includes a ROM 109, a RAM 110, a CPU 111, and input/output interfaces (not shown) for connecting to the network 103 and external apparatuses to be described later. The CPU 111 is a central processing unit. The CPU 111 performs overall control of the entire information processing apparatus 104 by executing an operating system program (hereafter abbreviated as an OS) stored in a storage unit such as a storage apparatus 108, which is an external apparatus, the ROM 109, or the RAM 110. Also, the CPU 111 reads programs stored in, e.g., the ROM 109 or the RAM 110 and executes various kinds of processing. For example, the CPU 111 controls each piece of hardware by performing, e.g., computation processing, data processing, and output using data inputted from the ROM 109, the RAM 110, or an external apparatus. The ROM 109 is a read-only memory and stores various programs to be executed by the CPU 111. The RAM 110 is a random-access memory capable of data reading and writing, and is also used as work memory by the CPU 111 during execution of processing. Note that in a case when the RAM 110 is a nonvolatile RAM, the RAM can store various programs as well.

The external apparatuses connected to the information processing apparatus 104 include, e.g., the printer 105 as a printing apparatus, a monitor 106 as a display unit, an input apparatus 107, and the storage apparatus 108. A printer usable as the printer 105 is one that uses any of various recording methods, including the inkjet method and the electrophotographic method.

The ROM 109 of the information processing apparatus 104 stores an album creating application program (hereafter referred to as an album creating app) 50. Note that the album creating app may be stored in a rewritable storage region, including, e.g., the RAM 110. The CPU 111 loads the album creating app 50 in the ROM 109 into the RAM 110 in response to an album creation instruction inputted through the input apparatus 107 and carries out the album creating processing in accordance with the album creating app 50 thus loaded. In this event, in accordance with the album creating app 50, the CPU 111 performs processing to obtain original image data stored in the information processing apparatus 104. Also, the CPU 111 generates album data by placing the image data thus obtained onto a template as selected and instructed by a user.

The information processing apparatus 104 is also capable of, e.g., outputting the generated album data to the printer 105 as print data and uploading the album data to the external server 102 via the network 103. Note that an "album" as referred to in the present embodiment includes a photo album and a photo book.

The external server 102 is a computer that has an input/output interface (not shown) for connecting to the printer 101 The external server 102 transmits and receives data to and from the printer 101 via this input/output interface. The external server 102 is, for example, a management server that performs, e.g., order-taking and management of an album, and performs processing in accordance with order data transmitted from the information processing apparatus 104 as instructed by a user, the processing including, e.g., order-taking processing, printing processing using the printer 101, and data processing for bookbinding.

The network 103 is connected to the information processing apparatus 104 and a transmission unit and reception unit of the external server 102, as well as other apparatuses. The network 103 is a communication network for apparatuses connected thereto to communicate information to one another.

Album data created by the information processing apparatus 104 can be uploaded to the external server 102 via the network 103. The external server 102 outputs the album data uploaded thereto to the printer 101 connected to the external server 102 in a case when the album data is in printable data format. For example, in a case when the external server 102 is a server that performs album order-taking and management, album data created by a user with the information processing apparatus 104 is uploaded to the external server 102. Then, once a necessary album purchase procedure is obtained from the information processing apparatus 104 used by the user, the external server 102 transmits the album data and a print instruction to the printer 101 as a printing apparatus. The printer 101 performs printing on predetermined print media according to the print instruction and the album data thus received. After that, the printed matters thus printed are bound by, e.g., an album creating company and then delivered to the user.

Meanwhile, the information processing apparatus 104 is also connected to the printer 105 as a printing apparatus that receives album data directly from the information processing apparatus 104 and prints the album data. The printer 105 prints user-owned album data transmitted from the information processing apparatus 104 to the printer 105, on predetermined print media. In this case, the printed matters printed by the printer 105 may be bound by the user to finish them into an album.

The printer 101 connected to the external server 102 and the printer 105 connected to the information processing apparatus 104 both have a print mechanism 121 for printing an image on a print medium and a print control unit 122 that controls the print mechanism 121. The print control unit 122 is in the form of a microcomputer including, e.g., a CPU, a ROM, and a RAM, none of which is shown. The ROM stores, e.g., a print control program for controlling the print mechanism, an application (hereafter referred to as an app) used for creating an album, and other fixed data. The RAM provided in the print control unit 122 has regions such as a region for loading inputted image data and a work region used by the CPU during computation processing. The CPU provided in the print control unit 122 loads the print control program stored in the ROM into the RAM, and based on the control program, performs predetermined computation and control of each driving unit in the print mechanism. The CPU can also load the application stored in the ROM into the RAM and execute part or all of the album creating processing to be described later based on the application.

The monitor 106 is a display apparatus that displays image information outputted from the information processing apparatus 104. The input apparatus 107 includes a keyboard, a pointing device, and/or the like, for a user to enter information into the information processing apparatus 104. The input apparatus 107 may be integral with a monitor and configured such that the monitor is directly touched for input.

The storage apparatus 108 is an external storage apparatus for storing, e.g., image data and templates having one or more image placement frames (slots) for placing images. Here, the storage apparatus 108 may be, e.g., a hard disk drive (HDD) or a solid-state drive (SSD).

Note that the block diagram in FIG. 1 depicts, e.g., the monitor 106, the input apparatus 107, and the storage apparatus 108 as external apparatuses connected to the information processing apparatus 104. However, the information processing apparatus may also be configured to include the monitor 106, the input apparatus 107, and the storage apparatus 108 integrally. In this case, the RAM 110 in the information processing apparatus may be provided with a region to be used as the storage apparatus 108.

(Album Data Generation Processing and Printing Processing)

Next, with reference to FIGS. 1 to 8, a description is given on album data generation processing and printing processing performed by the information processing system of the present embodiment.

To create an album 10, a user uses the album creating app 50 stored in the ROM 109 of the information processing apparatus 104 to instruct selection and placement of images to be in the album 10. Following the instructions, the CPU 111 executes image processing, such as resolution conversion processing to be described later, on each image data set and thereby generates album data. The album data thus generated is uploaded from the information processing apparatus 104 to the external server 102 via the network 103.

Figure 2:
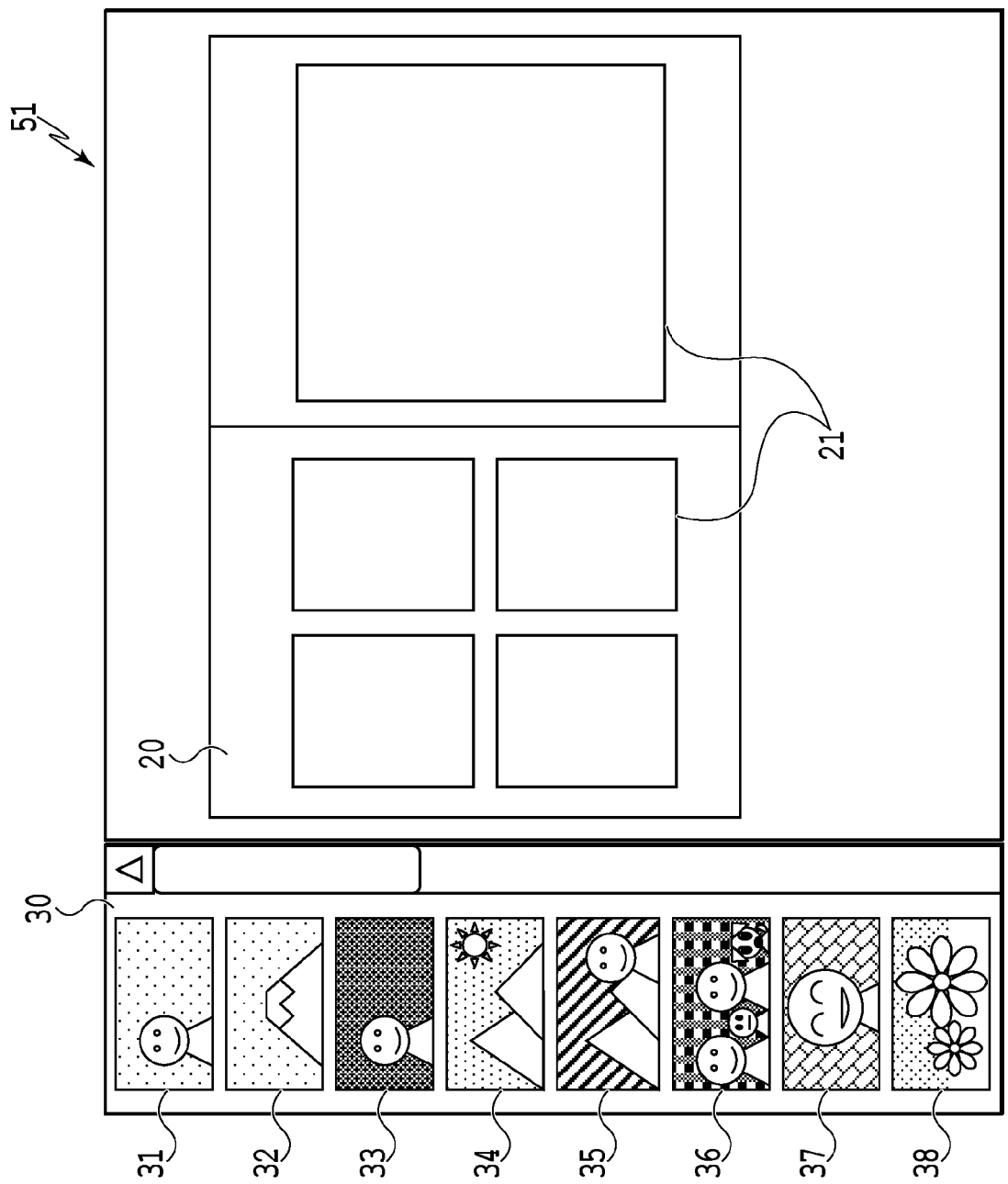
FIG. 2 is a diagram showing a user interface (UI) screen used for selecting and placing an image.

FIG. 2 shows an example of a user interface (UI) screen 51 for selecting and placing images through the album creating app 50. This UI screen 51 is displayed on the monitor 106 connected to the information processing apparatus 104. On the UI screen 51, a layout region (template) 20 to place images is displayed. The template 20 is provided with slots 21 for placing images. Note that the template 20 shown in FIG. 2 is merely an example, and the present disclosure is not limited to this. The album creating app 50 has templates with slots of various sizes and various layouts, and a user can select a template that they like. An image selection screen 30 is also displayed on the UI screen 51. Selection images 31 to 38 to use for creating an album are displayed on the image selection screen 30. Image data sets on the respective selection images 31 to 38 are original image data sets stored in the RAM 110 of the information processing apparatus 104 or the storage apparatus 108. Each of these original image data sets is image data representing an original image that has not been subjected to the resolution conversion processing to be described later.

A user selects an image from the selection images 31 to 38 and moves the image to any of the slots 21 in the template 20, and the image is thereby placed to fit into the size and position of the slot 21. Album data is generated by such placement of images into the slots 21. Such an album data set is created as many times as a desired number of pages in the album, and the album data sets are sent to the external server 102 to be printed by the printer 101. Printed media (printed matters) having the desired number of pages of the album printed thereon are then bound to complete an album, like the one shown in FIGS. 3 to 5.

Figure 3:
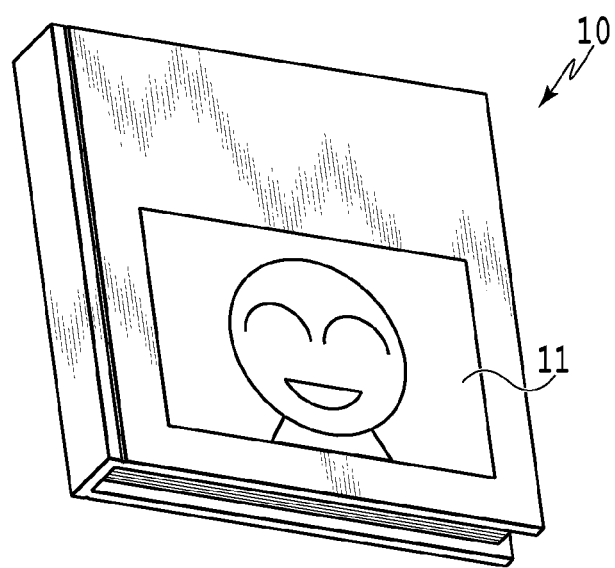
FIG. 3 is a perspective view of an album, seen from the front of the album.
Figure 4:
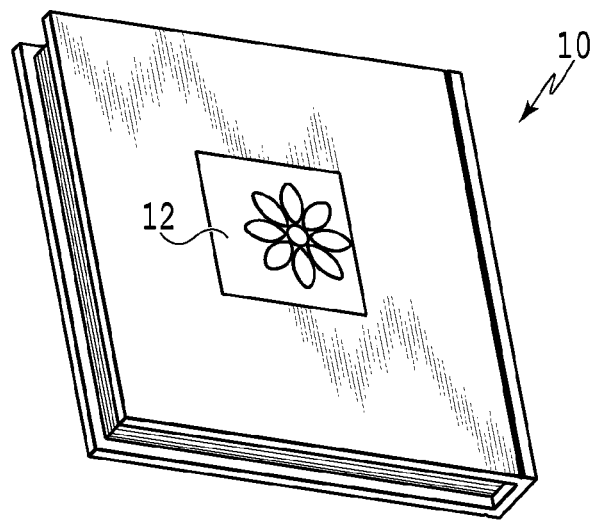
FIG. 4 is a perspective view of the album, seen from the back of the album.
Figure 5:
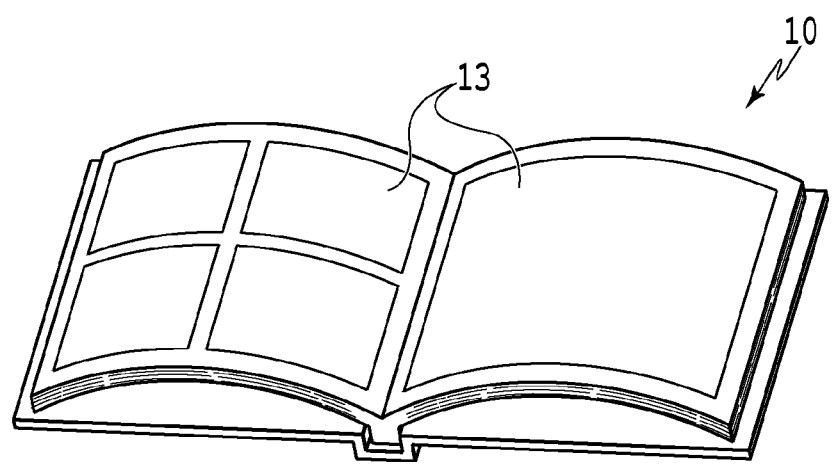
FIG. 5 is a perspective view of the album, opened.

FIGS. 3 to 5 are diagrams showing an example schematic configuration of the album created, FIG. 3 being a perspective view of the album 10 seen from the front, FIG. 4 being a perspective view of the album 10 seen from the back, and FIG. 5 being a perspective view of the album 10, opened. Also, in FIGS. 3 to 5, reference numeral 11 denotes an image placed on the front cover, 12 denotes an image placed on the back cover, and 13 denotes images placed on a two-page spread of the album.

Figure 6:
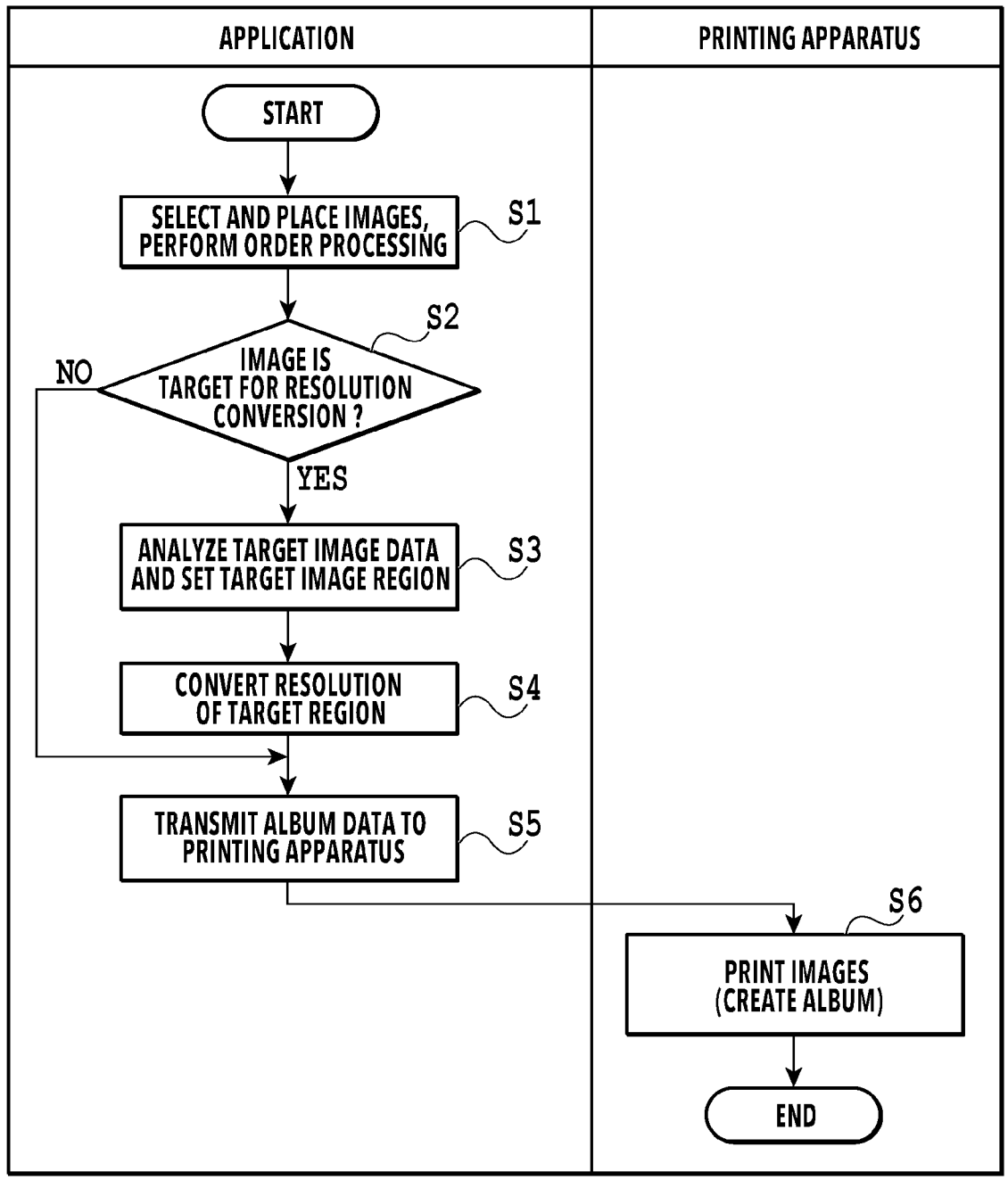
FIG. 6 is a flowchart showing an overview of album creating processing of a first embodiment.
Figure 7A:
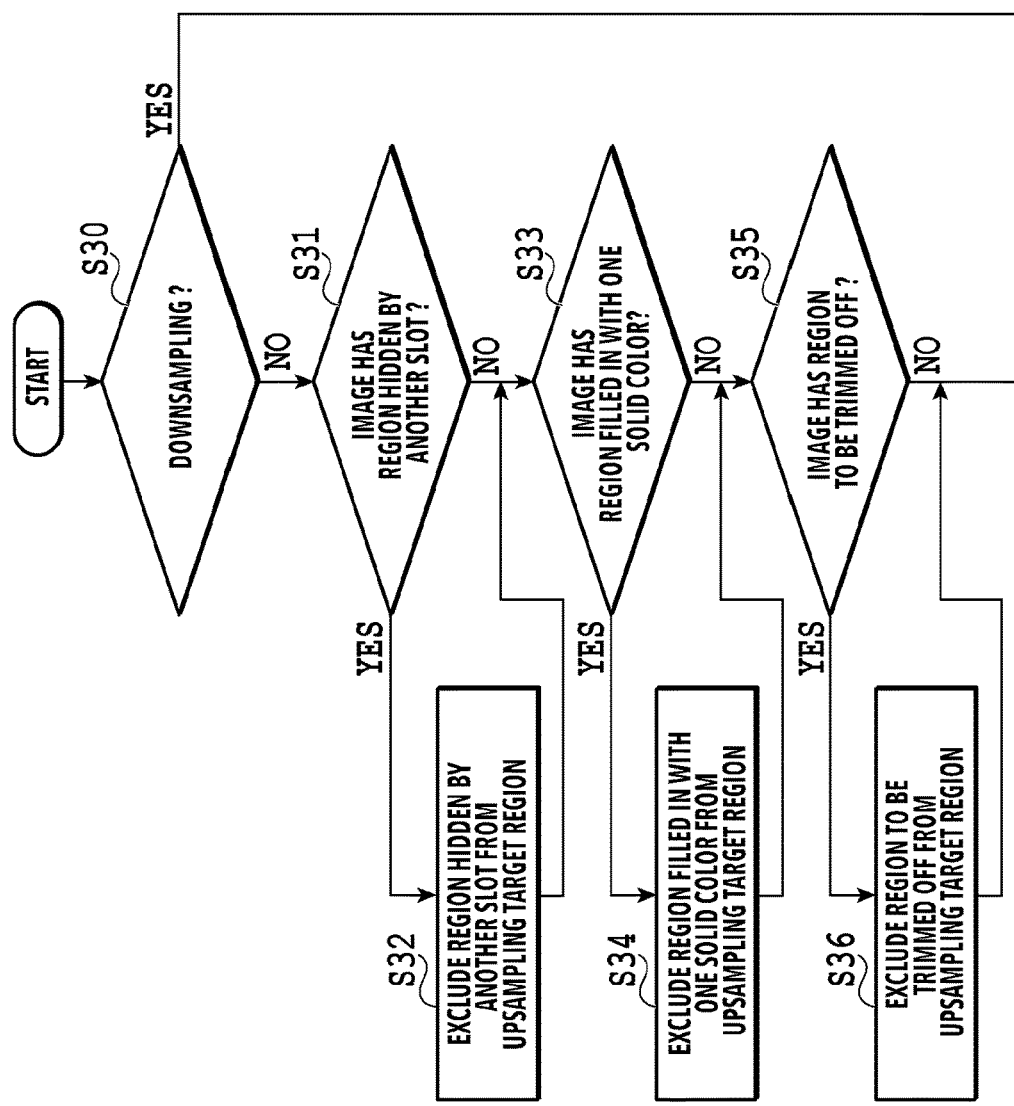

Now, following the flowcharts shown in FIGS. 6 and 7A and 7B, a description is given of processing executed by the information processing system of the present embodiment to create the album 10 like the one described above. The CPU 111 that forms a computer performs a series of processes shown in the flowcharts in FIGS. 6 and 7 by loading the album creating app stored in the ROM 109 into the RAM 110 and executing the album creating app. Note that the letter S that precedes each step number is an abbreviation of Step in the flowcharts in FIGS. 6 and 7 referred to in the present embodiment and the flowcharts in FIGS. 9 and 10 referred to in the second and third embodiments.

FIG. 6 is a flowchart showing an overview of processing to create the album 10 carried out in the present embodiment. In response to a user instruction to create an album through the input apparatus 107, the CPU 111 performs the album data generation processing described below in accordance with the album creating app 50.

In S1, the CPU 111 displays the template 20 and the image selection screen 30 shown in FIG. 2 on the monitor 106. Then, the user selects images that they like from a plurality of images displayed on the image selection screen 30, and places the selected images onto the slots 21 provided in the template 20. Album data is thus generated. The user can check a page on which the images are placed on the slots 21 using a preview screen displayed on the monitor 106. Also, as needed, the user can edit the image data on the images on the page displayed on the preview screen. This editing includes, for example, switching the positions of images within the template 20 and replacing an image already placed within the album with another image not placed in the album.

In response to the user placing an order of the album after the selection and placement of the images, the selected images and their corresponding slots are fixed. Here, once order placement of the album is instructed, the CPU 111 executes order placement processing for the order placement of the album in accordance with the album creating app 50. In this event, as the order placement processing, the CPU 111 executes processing to access a website for the user to, e.g., make a payment for printing the album and enter the shipping address. More specifically, the CPU 111 passes the URL of the website for processing the order placement of the album to a web browser and accesses the website through the web browser. Then, in response to the user entering various pieces of information on the website, such as the shipping address and payment information for the album, and pressing the "Place your order" button, the order is finalized.

Once the order is finalized by the above order placement processing, the processing proceeds to S2. In S2, the CPU 111 performs processing to analyze the properties, such as the resolution, of the image data sets on the respective images contained in the album data the order of which has been finalized. Then, in conformity to the predetermined criteria such as image resolutions, the CPU 111 determines, for each image data set, whether the image data needs to undergo resolution conversion processing. Note that the properties of image data include image information defined in its original image data, such as resolution, pixel information, and color information. The resolution conversion processing includes upsampling that enhances the resolution of image data by increasing the pixel count of an image represented by the image data, and downsampling that lowers the resolution of image data by decreasing the pixel count of an image represented by the image data. If determining that image data placed in a slot 21 is an image that needs to undergo resolution conversion processing (hereafter referred to as a target image), the CPU 111 proceeds to the processing in S3. If determining that image data placed in the slot 21 is not target image data, the CPU 111 proceeds to the processing in S5.

In S3, the CPU 111 performs processing to analyze the properties of the image data on the target image placed in the slot 21. The CPU 111 also performs processing to analyze image effects, trimming information, and layout information on each target image data set. The layout information includes, e.g., the layout position of each target image data set and an overlap with another slot. Then, based on the analysis results on the image information, the analysis results on the layout information, and the type of resolution conversion processing (upsampling or downsampling) on each target image, the CPU 111 performs processing to set a target region for resolution conversion processing (a conversion target region).

Next, in S4, the CPU 111 preforms resolution conversion processing on the target region in each of the image data sets in accordance with the album creating app 50. This resolution conversion processing includes, as described above, upsampling that increases the pixel count of image data and downsampling that decreases the pixel count of image data. Various methods can be used for the upsampling. One example of the methods is interpolation computation using pre-upsampling image data. In a case of using this method to perform upsampling such that the longitudinal pixel count and the lateral pixel count may each double, the following processing is performed. First, interpolation computation is performed to find the average pixel value (such as luminance value) of two adjacent pixels in pre-upsampling image data. Then, a pixel having the pixel value thus calculated is set as a pixel between the two adjacent pixels. Then, as a pixel to be located at the center of neighboring four pixels (2×2 pixels), i.e., two in the longitudinal direction and two in the lateral direction in the pre-upsampling target image data, a pixel having the average pixel value (such as luminance value) of those four pixels is set.

Various methods can be used for the downsampling as well. One example of those methods is to delete pixels at predetermined intervals in pre-downsampling target image data, i.e., thin out the pixels, to reduce the number of pixels.

After executing the above resolution conversion processing, the CPU 111 proceeds to the processing in S5, and in S5, in accordance with the album creating app 50, the CPU 111 transmits the album data to a printer that is an image printing apparatus. In the present embodiment, the printer 101 connected to the external server 102 is used as the printing apparatus. Thus, the CPU 111 transmits the created album data to the printer 101 via the network 103 and the external server 102. The printer 101 uses the album data thus received to print images on predetermined print media (e.g., paper media). After that, the print media (printed matters) having the images printed thereon are bound so that the album is completed as a final product.

Note that the method for the upsampling for increasing the resolution of image data (increasing the pixel count) is not limited to the above example. Other methods of upsampling include performing edge restoration by use of a filter that uses deep learning. Also, in the example given in the present embodiment, analysis processing is performed on target image data after a user instructs order placement. Instead, the analysis may be performed before the order placement instruction is made, once image data is placed in the slot 21 by a user.

Based on the flowcharts in FIGS. 7A and 7B, a detailed description is now given on the image analysis processing in S3 (FIG. 6), the setting processing being for setting a target region for the resolution conversion processing to be performed in S4 (FIG. 6). In this example, eight conditions to be described later are defined as particular conditions for setting a target region to be subjected to resolution conversion processing in each target image data set. Then, the setting processing shown in FIGS. 7A and 7B is repeated for every image placed in an album in the processing in S1 and S2 in FIG. 6. Note that S30 to S44 in FIGS. 7A and 7B correspond to S3 in FIG. 6, and S45 corresponds to S4 in FIG. 6.

In S30, the CPU 111 selects one of the target image data sets that correspond to the plurality of images placed in the album, and determines whether the resolution conversion processing to be executed on the target image data set is downsampling. If the resolution conversion processing to be executed is downsampling (if the determination result is YES), the CPU 111 proceeds to S45 to set the entire region of the image data as a target region for the resolution conversion processing and executes downsampling on the entire region of the image data. This allows downsizing of the file size of the image data, which enables shortening the time it takes to transfer the album data. However, in a case when the time it takes for the processing for downsampling would be longer than the amount of the transfer time to be shortened by the downsampling or in a case when more importance is placed on low power consumption, a setting may be set to exclude the entire image region from a resolution conversion processing target region, so that no downsampling would be performed in S45.

If the determination result in S30 is NO, the CPU 111 proceeds to S31. In S31, the CPU 111 determines whether an image represented by the image data set currently being selected as a determination target has an image region hidden by an image placed in another slot or an object such as a stamp. If the determination result is YES, the CPU 111 proceeds to S32 and excludes the image region hidden by another image from the resolution conversion target region. Consequently, in S45, the resolution conversion processing (upsampling) is not performed on the image region thus excluded.

The processing in S31 and S32 is now described more specifically. After a plurality of images are laid out in S1 in FIG. 6 as shown in FIG. 2 and then an instruction to finalize the order is received from a user, the CPU 111 obtains layout information on the layout of the plurality of images. In S30, the CPU 111 refers to the layout information. The layout information includes information on the layout page of an image laid out in the album and information on the layout position and size of the image on the layout page. The layout information also includes information indicating whether the image overlaps with another image and, if the image overlaps with another image, information on an overlap portion of the image with the other image. If the image overlaps with another image, the layout information further includes information indicating which image is on top of the other (i.e., which image is displayed or printed in the overlap portion).

In S31, the CPU 111 makes the determination by referring to the layout information, or more specifically, the information indicating whether an image represented by the determination target image data overlaps with another image and the information indicating whether the image is on top (i.e., whether the overlap portion is displayed or printed). Then, if determining that the image is under (i.e., the overlap portion is not displayed or printed), the CPU 111 proceeds to the processing in S32. Then, in S32, the CPU 111 identifies the overlap portion of the image represented by the determination target image data with another image by referring to information, in the layout information, indicating such overlap portion, and sets a setting such that the overlap portion will be excluded from the upsampling target.

In this way, the present embodiment is configured not to perform resolution conversion processing (upsampling) on an image region hidden by another object (image data). This is because an image region hidden by another object will not be printed, and even if resolution conversion processing (upsampling) is performed on such a region, the resolution conversion processing would not benefit the image and therefore there is no point of performing the resolution processing Excluding a region hidden by another object from the resolution conversion processing target region allows shortening of the time it takes for the resolution conversion processing and reduction in power consumption, without affecting the image on the printed matter.

If the determination result in S31 is NO or after the processing in S32 is performed, the CPU 111 proceeds to the processing in S33. In S33, the CPU 111 determines whether the image currently being selected as a determination target has a region filled in with one solid color. If there is a region filled in with one solid color (if the determination result in S33 is YES), the CPU 111 proceeds to S34 and excludes this region from the resolution conversion target region. Consequently, this region thus excluded is not subjected to the resolution conversion processing (upsampling) in S45. This is because performing resolution conversion processing on a region filled in with one solid color only increases pixels of the same color, and it is unlikely that the user sees the difference made by the resolution enhancement on the printed matter. In other words, the resolution conversion processing does not contribute to an improvement in image quality. For this reason, excluding a region filled in with one solid color from a resolution conversion processing target region allows shortening of the time it takes for the resolution conversion processing and also reduction in power consumption, without affecting image quality. Note that the determination result in S33 may be YES even in a case when a region filled in with color is not completely in one color, as long as the region is formed by colors that are visually similar enough to be regarded as the same color.

If the determination result in S33 is NO or after the processing in S34 is performed, the CPU 111 proceeds to the processing in S35. In S35, the CPU 111 determines whether the determination target image currently being selected has a region to be trimmed off. If there is a region to be trimmed off (if the determination result in S35 is YES), the CPU 111 proceeds to S36 and excludes this region from the resolution conversion target region. In a case when, for example, a user has set a trimming setting, the CPU 111 in S35 refers to the trimming setting and performs the processing in S35 and S36. Also, there is a case when an image is automatically trimmed because, for example, the shape of the image is different from the shape of the slot in which the image is to be placed. In this case, the CPU 111 in S35 performs the processing S35 and S36 based on the size and shape of the image and the size and shape of the slot, which are included in the layout information. The region thus excluded is not subjected to the resolution conversion processing in S45. Since an image region to be trimmed off will not be printed, performing resolution conversion processing (upsampling or downsampling) on such a region would not be beneficial, and therefore there is no point of performing the resolution conversion processing For this reason, excluding such a region from a resolution conversion processing target region allows shortening of the time it takes for the resolution conversion processing and also reduction in power consumption, without affecting image quality.

If the determination result in S35 is NO or after the processing in S36 is performed, the CPU 111 proceeds to the processing in S37. In S37, the CPU 111 determines whether the image currently being selected as a determination target has an image region located in the vicinity of the gutter of the album 10 (the inner margins of facing pages of the album 10 being open). The CPU 111 also determines whether the album is bound with a method that makes the gutter area difficult to open, such as perfect binding and side-stitch binding. If determining that the image data has an image region located in the vicinity of the gutter and that the album is going to be bound using a binding method that makes it difficult for the gutter area to open (if the determination result in S37 is YES), the CPU 111 proceeds to the processing in S38. In S38, the CPU 111 excludes the image region located in the vicinity of the gutter from the resolution conversion processing target region. Consequently, the image region thus excluded is not subjected to the resolution conversion processing (upsampling or downsampling) in S45. Note that the CPU 111 performs the processing in S37 and S38 based on information indicating the position of the image placed on the page, which is included in the layout information.

Typically, in an album bound with perfect binding or side-stitch binding, the gutter area is difficult to open, and for this reason, an image placed in that area may contain a region that is invisible or almost invisible to the user. Performing resolution conversion processing (upsampling or downsampling) on such an image region that is almost invisible to the user contributes little to improvement in the quality of the album as a finished product. In other words, the resolution conversion processing would not be beneficial. For this reason, excluding an image region located in the vicinity of the gutter from the resolution conversion processing target region allows shortening of the time it takes for the resolution conversion processing and also reduction in power consumption, without affecting image quality. Note that the determination result of the determination processing in S37 may be YES not only in a case when there is an image region in the gutter area, but also in a case when there is an image region that is difficult for the user to see and, thus, to see the improvement made by resolution enhancement. Also, for the determination processing in S37, an image region for use for determination may be defined in advance for each album product (print media) or each binding method.

If the determination result in S37 is NO or after the processing in S38 is performed, the CPU 111 proceeds to the processing in S39. In S39, the CPU 111 determines whether the image currently being selected as a determination target has an image region subjected to, e.g., bokeh processing or filtering processing. Typically, an image region subjected to, e.g., bokeh processing or filtering processing is a region where resolution enhancement is difficult to see. For this reason, if there is an image region subjected to bokeh processing or filter processing (if the determination result is YES in S39), the CPU 111 proceeds to S40 and excludes this image region from the resolution conversion processing (upsampling) target region. Consequently, the image region thus excluded is not subjected to the resolution conversion processing in S45.

Laying out image data in the album 10 may include placing a background image on the entire spread of pages in the album. A background image may be subjected to bokeh processing in order to make images placed on top of it stand out. In this case, it is difficult to see resolution enhancement in the background image that has been subjected to bokeh processing. For this reason, even in a case when upsampling is performed on a background image, it is difficult for the user to see the resolution enhancement. In other words, the effectiveness of upsampling is low. For this reason, as described above, an image region subjected to bokeh processing, such as a background image, is excluded from the resolution conversion processing (upsampling) target region. This allows shortening of the time it takes for the resolution conversion processing and also reduction in power consumption, without affecting image quality.

If the determination result in S39 is NO or after the processing in S40 is performed, the CPU 111 proceeds to the processing in S41. In S41, the CPU 111 determines whether the image currently being selected has an image region that is going to be cut off at the time of printing or bookbinding. If there is an image region to be cut off (if the determination result in S41 is YES), the CPU 111 proceeds to the processing in S42 and excludes the image region to be cut off from the resolution conversion processing target region. Consequently, the image region thus excluded is not subjected to the resolution conversion processing in S45.

Some album creating apps allow a user to place image data beyond the edge of the album 10. The portion beyond the edge of the album 10 is going to be cut off at the time of bookbinding. Since there is no point of performing resolution conversion processing (upsampling or downsampling) on an image region that is going to be cut off, such an image region is excluded from the resolution conversion processing target region. This allows shortening of the time it takes for the resolution conversion processing and also reduction in power consumption, without affecting image quality. Note that the CPU 111 performs the processing in S41 and S42 based on information on the position and size of the image placed on a page, which is included in the layout information.

If the determination result in S41 is NO or after the processing in S42 is performed, the CPU 111 proceeds to the processing in S43. In S43, the CPU 111 determines whether the image currently being selected as a determination target has an image region that is going to be printed on an album product (print medium) on which high-resolution printing cannot be done. If there is such an image region, the CPU 111 proceeds to S44 and excludes this image region from the resolution conversion processing target region. Consequently, the region thus excluded is not subjected to the resolution conversion processing in S45. Some album products include a portion made of a material on which high-resolution printing cannot be done, such as washi (Japanese paper). Even in a case when resolution conversion processing is performed on an image region to be printed on a portion on which high-resolution printing cannot be done, the user cannot see the effect of the resolution enhancement processing. For this reason, excluding an image region to be printed on a portion on which high-resolution printing cannot be done from the resolution conversion processing target region allows shortening of the time it takes for the resolution conversion processing and also reduction in power consumption, without affecting image quality. Note that in regard to an image that does not fall under any of the determination conditions in the above determination processing (S30, S31, S33, S35, S37, S39, S41, and S43), the entire region of the image is a target region for the resolution conversion processing (upsampling or downsampling). Note that the CPU 111 performs the processing in S43 and S44 based on a setting on the type of paper and information indicating the position of the image placed on a page, which is included in the layout information. Note that a setting on the type of paper is set as instructed by a user on a setting screen (not shown).

Various methods can be used to manage the resolution conversion processing target region. A first management method is to manage the target region by recording the positions of pixels to be subjected to resolution conversion processing. A second management method is to manage a rectangular region encompassing the resolution conversion processing target region.

Figure 8:
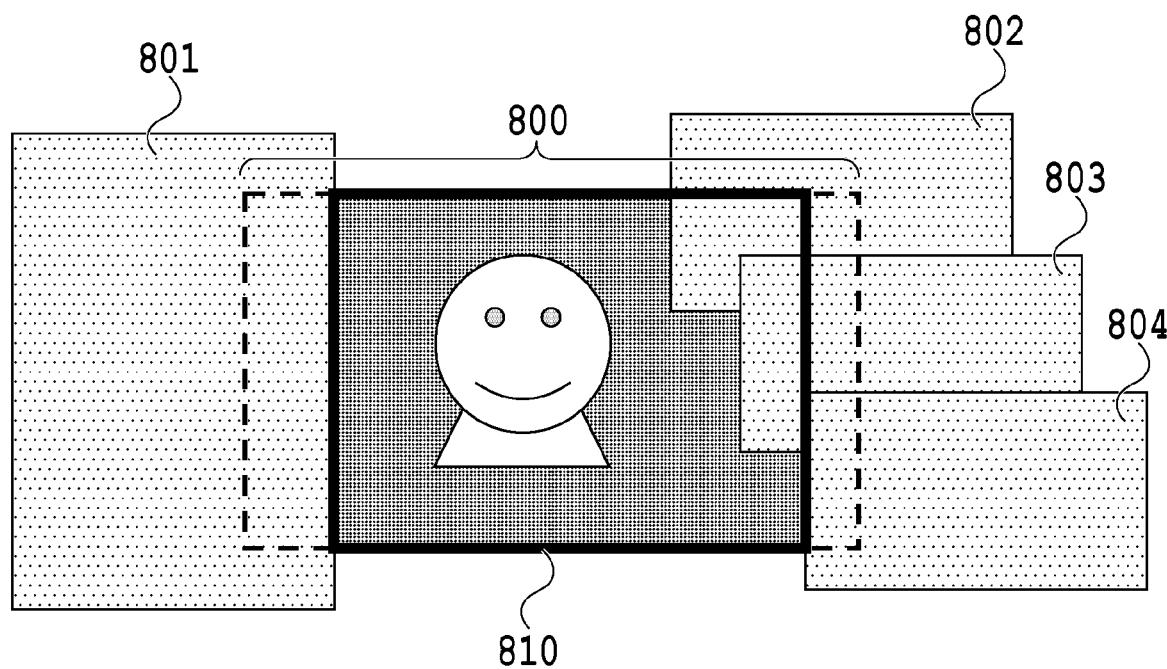
FIG. 8 is a diagram showing a rectangular region that encompasses a target region for resolution conversion processing.

FIG. 8 is a diagram showing a rectangular region encompassing a resolution conversion processing target region. In FIG. 8, reference numerals 800 to 804 denote images placed on the same page of the album 10. In the example shown, the images are placed such that they overlap with the other images partially. For example, the image 800 is partially hidden by overlapping with the other images 801 to 804. The resolution conversion processing target region of the image 800 is a region not hidden by the other images 801 to 804, and a rectangular region 810 including this region (the rectangular region in bold line in FIG. 8) is a region managed by the second management method.

The method of managing the rectangular region 810 may use, e.g., the positions of the pixels at the four vertices of the rectangular region or the position of the pixel at the upper left vertex, the length (pixel count) of the horizontal side, and the length (pixel count) of the vertical side. The rectangular region used in the second management method may include a region that does not need resolution conversion processing, but the second management method is effective in a case when there is a restriction that resolution conversion processing cannot be performed unless the region is rectangular.

The flowcharts in FIGS. 6 and 7 are referred to again here. After performing the processing in S3 in FIG. 6, i.e., the resolution conversion processing target region setting processing as exemplified in FIGS. 7A and 7B, the CPU 111 proceeds to S4 (FIG. 6) and performs resolution conversion processing on the target region thus set. There are various methods as a method for performing resolution conversion processing only on the resolution conversion processing target region.

In a case of using the first management method described above, first, two sets of target image data are prepared as first image data and second image data, and pixels are increased in the entire first image data using a simple method not involving deep learning. Next, the above-described upsampling using deep learning is performed on a target region in the second image data. Lastly, the pixels in the resolution conversion processing target region in the first image data in which pixels have been increased are overwritten by the pixels in the upsampled second image data. Image data is thus created.

In a case of using the second management method described above, first, pixels of the entire image data are increased using a simple method not involving, e.g., deep learning. Next, using a filter using deep learning described above, edge restoration is performed on the pixels in the target region in the image data whose pixels have been increased. Image data is thus created. After resolution conversion processing is completed for target regions in all images, the CPU 111 proceeds to S5 and transmits, to the printer 101 or 105, album data incorporating the image data on the images that have been subjected to the resolution processing.

As thus described, in the present embodiment, resolution conversion processing is performed only on image data corresponding to a conversion target region in an original image that satisfies the predetermined conditions, and resolution conversion processing is not performed on image data corresponding to an image region other than the conversion target region, so that the image data in the original image is used as-is. This allows, e.g., creation of a high-quality album with high resolution, shortening of the time it takes for the resolution conversion processing, reduction in the power consumed by the resolution conversion processing, and shortening of the time it takes to transfer the album data.

Note that the order of the eight determination processing steps shown in FIGS. 7A and 7B is not limited to the example shown, and may be changed to any other order. Also, unnecessary determination processing may be omitted.

In the above embodiment, after the order placement of the album is finalized by the processing in S1, the target region setting processing (S3) and the resolution conversion processing (S4) are executed on each of the fixed images. In other words, the processing in S3 and S4 is executed only on the image data that has been fixed for printing. Thus, the above embodiment employs an approach such that image data that has been subjected to the resolution conversion processing will not be replaced later by other image data and excluded from a print target. This approach can prevent the processing executed in S3 and S4 from going to waste.

It is also possible to take an approach of executing the resolution conversion processing target region setting processing and the resolution conversion processing while the images are still replaceable. For example, image selection and placement are executed in S1 in FIG. 1, and then the target region setting processing (S3) and the resolution conversion processing (S4) are executed for each of the image data sets. Further, a preview is displayed of an album including the image data sets that have been subjected to the resolution conversion processing. Then, in a case when an image is replaced, the CPU 111 executes the processing in S3 and S4 on the newly selected image.

In this approach, a preview of an album is displayed that includes images reflecting the results of the resolution conversion processing. Thus, a user can see what the finish of the album will look like more accurately. Also, in a case when an image is replaced with a different image, it is possible to check, using a preview, the newly selected image reflecting the result of the resolution conversion processing, which makes it possible for a user to see the finish of every image in the album accurately.

Second Embodiment

Next, a second embodiment of the present disclosure is described with reference to the flowchart in FIG. 9. The information processing system of the present embodiment includes the configuration shown in FIG. 1. Also, the UI screen 51 shown in FIG. 2 is used for selecting and setting images.

Figure 9:
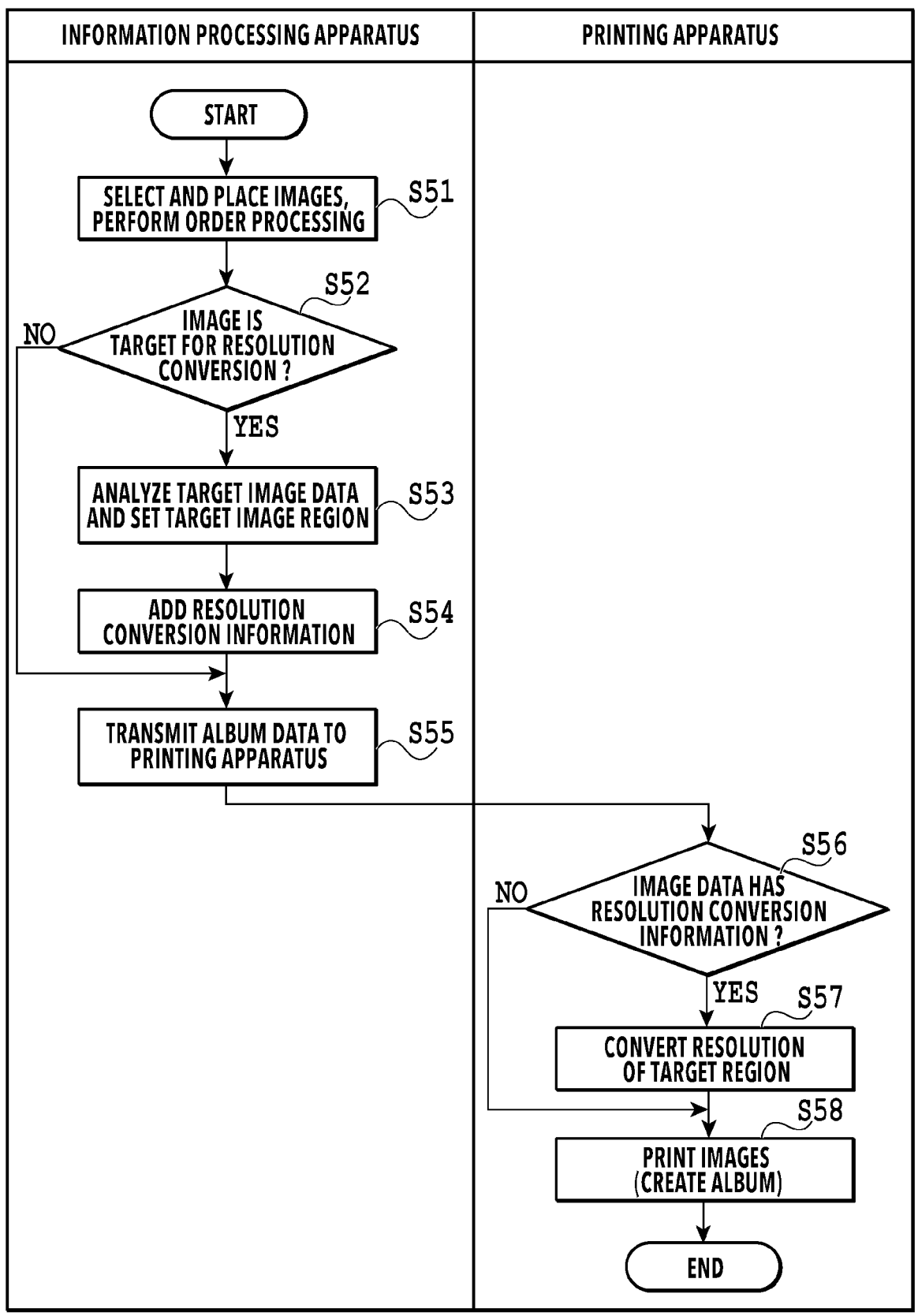
FIG. 9 is a flowchart showing an overview of album creating processing of a second embodiment.

In the present embodiment, the CPU 111 that forms a computer executes the processing in S51 to S55 shown in the flowchart in FIG. 9 by loading the album creating app stored in the ROM 109 into the RAM 110 and executing the album creating app. Meanwhile, a CPU provided in a printing apparatus (the printer 101 or the printer 105) performs the processing in S56 to S58 by loading an application (hereafter referred to as an app) stored in a ROM into a RAM and executing the app.

In the first embodiment described above, the CPU 111 of the information processing apparatus 104 executes the resolution conversion processing (S104) in accordance with the album creating app 50. By contrast, in the present embodiment, the resolution conversion processing is executed not by the information processing apparatus 104, but by the CPU provided in a printing apparatus in accordance with an application provided in the printing apparatus. Note that the present embodiment also uses the UI screen 51 shown in FIG. 2 for selecting and setting images.

With reference to the flowchart shown in FIG. 9, processing executed in the present embodiment is described below.

In S51, the CPU 111 of the information processing apparatus 104 displays the template 20 and the image selection screen 30 in accordance with the album creating app 50. A user selects images that they like from a plurality of selection images 31 to 38 (original images) displayed on the image selection screen 30, and places the selected images onto the slots 21 provided in the template 20. Album data is thus generated. In response the user placing an order of the album after the selection and placement of the images, the selected images and their corresponding slots 21 are fixed. Details of the processing in S51 are the same as those in S1 in FIG. 6.

Next, in S52, the CPU 111 analyzes image data sets on the respective images included in the album data the order of which has been finalized, and in conformity to the predetermined criteria such as image resolutions, determines, for each image data set, whether the image data set is a target for resolution conversion processing (target image data). The CPU 111 proceeds to S53 if determining that the selected image is resolution conversion processing target image data, or proceeds to S55 if determining that the selected image is not target image data. Note that details of the processing in S52 are the same as those in S2 in FIG. 6.

In S53, the CPU 111 analyzes image information on the target image data, such as pixel information and color information. The CPU 111 also analyzes, e.g., image effects, image information such as trimming information, and layout information on each target image data set. Then, based on the analysis results on the image information, the analysis results on the layout information, and the type of the resolution conversion processing (upsampling or downsampling) on each target image, the CPU 111 sets a resolution conversion processing target region in the target image data. Note that details of the processing in S53 are the same as those in S3 in FIG. 6 and S30 to S44 in FIGS. 7A and 7B.

Next, in S54, the CPU 111 adds resolution conversion information to each target image data set included in the album data, the resolution conversion information being the target region determined in S53 and the type of resolution conversion processing (upsampling or downsampling). After that, the CPU 111 transmits the album data to a printing apparatus, for example, the printer 101 shown in FIG. 1 (S55). The image data in this album data have yet to be subjected to resolution conversion processing.

In the printer 101 that has received the album data, the CPU in the print control unit 122 checks each image data set included in the album data in accordance with the app stored in the ROM to see whether the image data set has resolution conversion information (S56). Then, in S57, based on the resolution conversion information, the CPU in the print control unit 122 performs resolution conversion processing on the target image region in the image data included in the album data. Note that the processing in S56 (and the processing in S57 if the determination result in S56 is YES) is executed on all the images placed in the album, or in other words, is repeated for every target image data set included in the album data transmitted in S55.

Next, using the album data including the image data that has been subjected to the resolution conversion processing, the CPU in the print control unit 122 controls the print mechanism 121 to print the album data on print media (S58). After that, the print media having the images printed thereon (printed matters) are bound, so that the album 10 is completed as a final product. Note that the details of the image analysis processing and the target image region setting processing performed in S53 in the present embodiment are the same as those shown in FIG. 3 and are therefore not described here.

As thus described, in the present embodiment, resolution conversion (upsampling or downsampling) is performed only on image regions satisfying the predetermined conditions (conversion target regions), and resolution conversion is not performed on image data in other image regions, so that the image data with the original resolution is used. This allows shortening of the time it takes for the resolution conversion processing and for the transfer of album data and reduction in power consumption, making it possible to achieve both creation of a high-quality album and streamlining of the album creation processing.

The present embodiment employs a configuration in which album data is generated by cooperation between the processing performed by the information processing apparatus 104 in accordance with the album creating app 50 and the processing performed by the printer 101 in accordance with the app therein. For this reason, the present embodiment can reduce information processing loads imposed on the information processing apparatus 104 and the printer 101.

In the example discussed in the present embodiment, the determination processing (S52) and the conversion information addition processing (S54) are executed on image data after an order of an album is finalized. However, the timing to perform such processing is not limited to the above example. The determination processing and the addition processing may be executed while the images are still replaceable.

Third Embodiment

Figure 10:
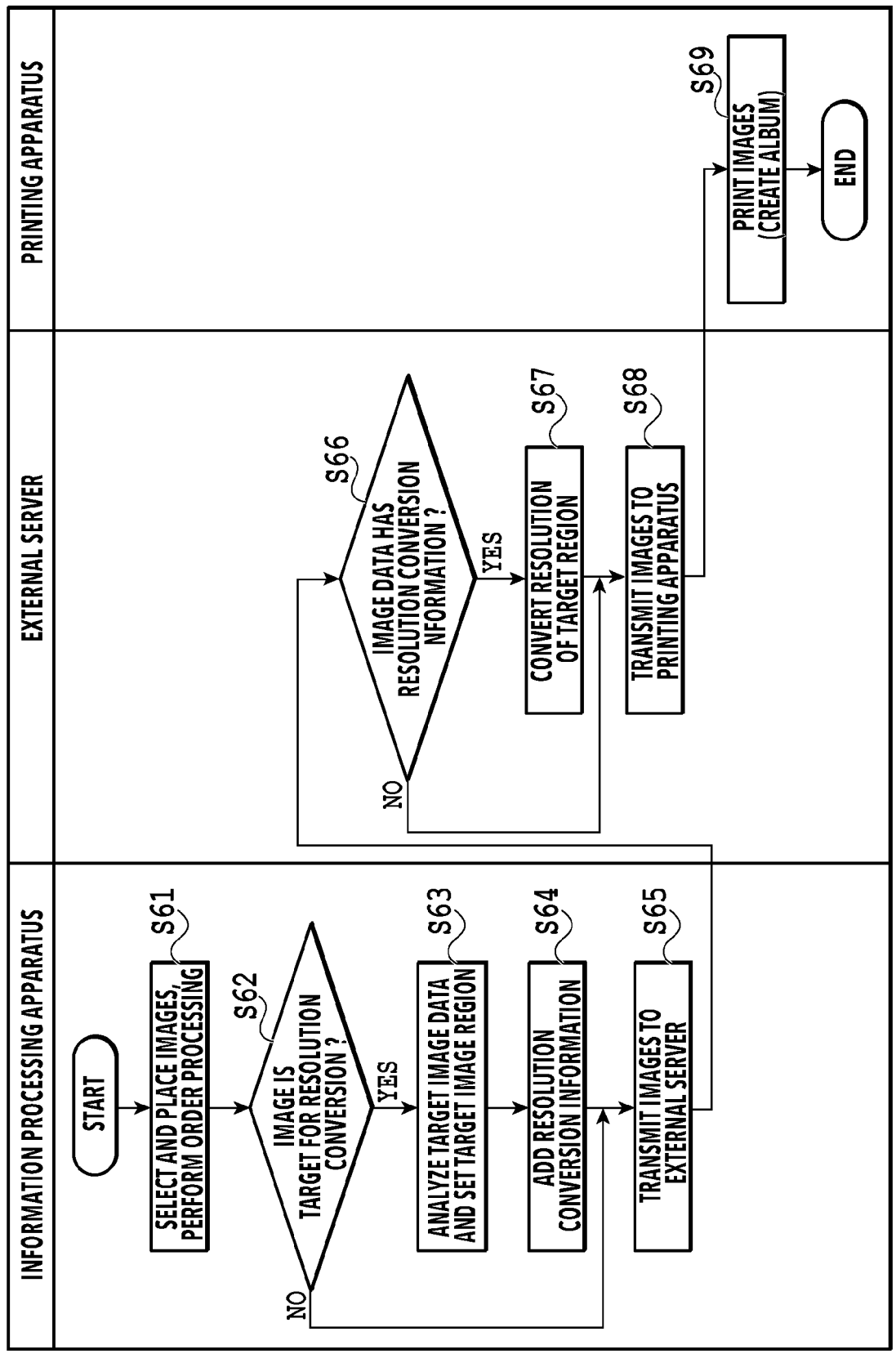
FIG. 10 is a flowchart showing an overview of album creating processing of a third embodiment.

Next, a third embodiment of the present disclosure is described with reference to the flowchart in FIG. 10, the configuration of the information processing system shown in FIG. 1, and the UI screen 51 shown in FIG. 2 provided by the album creating app 50. The CPU 111 performs the processing in S61 to S65 shown in the flowchart in FIG. 10 by loading the album creating app stored in the ROM 109 into the RAM 110 and executing the album creating app. Meanwhile, the CPU provided in the external server 102 performs the processing in S66 to S68 by loading an application (hereafter referred to as an app) stored in the ROM into the RAM and executing the app. The processing in S69 is executed by the print control unit 122 provided in a printing apparatus (the printer 101 or the printer 105). In other words, in the present embodiment, the resolution conversion processing (S57) executed by the printing apparatus in the second embodiment is executed by the external server (the management server) 102 having an image processing function. Like the first embodiment, the present embodiment also uses the UI screen 51 shown in FIG. 2.

Following the flowchart shown in FIG. 10, processing executed in the present embodiment is described below. In S61 to S64 shown in FIG. 10, processing similar to that performed in S51 to S54 (FIG. 9) in the second embodiment is performed. Specifically, in S61, the CPU 111 of the information processing apparatus 104 displays the template 20 and the image selection screen 30, so that a user can select and fix images and their corresponding slots 21. Then, in S62, the CPU 111 determines, for each image data set included in the album data, whether the image data set is target image data that needs to undergo resolution conversion processing. Then, in S63, the CPU 111 sets a resolution conversion processing target region in the target image data. Then, in S64, the CPU 111 adds resolution conversion information to the target image data included in the album data, the resolution conversion information being the resolution conversion target region and the type of resolution conversion processing.

After that, in the present embodiment, the CPU 111 in S65 transmits the album data to the external server 102. The image data in this album data have yet to be subjected to resolution conversion processing. The CPU in the external server 102 that has received the album data performs the processing in S66 to S68 in accordance with the app implemented in the external server 102. In S66, the CPU of the external server 102 checks each image data set included in the album data to see whether the image data has resolution conversion information Next, in S67, based on the resolution conversion information, the CPU in the external server performs resolution conversion processing on the target image data included in the album data. Note that details of the processing in S66 and S67 are the same as those in S56 and S57 in FIG. 9. After that, in S68, the CPU of the external server 102 transmits the album data containing the image data that have been subjected to the resolution conversion processing to a printing apparatus (e.g., the printer 101).

In S69, the printer 101 that has received the album data performs printing using the album data containing images that have been subjected to the resolution conversion processing (upsampling). Print media having the images printed thereon (printed matters) are bound, so that the album is completed as a final product. Note that details of the image analysis processing and the target image region determination processing performed in S63 in the present embodiment are the same as those shown in FIG. 3 and are therefore not described here.

As thus described, in the present embodiment, resolution conversion is performed only on image regions satisfying the predetermined conditions (conversion target regions), and resolution conversion is not performed on image data in other image regions, so that the original image data with the original resolution is used. This allows shortening of the time it takes for the resolution conversion processing and for the transfer of the album data and reduction in power consumption, making it possible to achieve both creation of a high-quality album and streamlining of the album creation processing.

The present embodiment employs a configuration in which album data is generated by cooperation between the processing performed by the information processing apparatus 104 in accordance with the album creating app 50 and the processing performed by the external server 102 in accordance with the app therein. For this reason, the present embodiment can reduce information processing loads imposed on the information processing apparatus 104 and the external server 102 in creating album data. Further, the printing apparatus is responsible only for printing operations based on the album data created. For this reason, an information processing load imposed on the printing apparatus is also reduced, which improves the throughput of the printing apparatus.

Also, in the present embodiment, the determination processing (S62) and the conversion information addition processing (S64) are executed on image data after an order of an album is finalized. Alternatively, the determination processing and the addition processing may be executed while the images are still replaceable.

OTHER EMBODIMENTS

In the examples described in the above embodiments, the information processing system generates album data including image data that have been converted from original image data by resolution conversion processing. However, the information processing system of the present disclosure is not limited to such examples. The information processing system according to the present disclosure is also applicable to a technique that generates image data other than album data by converting the resolution of its original image data.

Also, in the examples shown in the above embodiments, the information processing system is configured including the information processing apparatus 104, the external server 102, and the printing apparatuses (the printers 101, 105). However, the configuration of the information processing system is not limited to these examples. The information processing system of the present disclosure may be configured including only one of the information processing apparatus 104, the external server 102, and the printing apparatus (the printer 101 or the printer 105). In other words, a processing configuration (a processing system such as a computer) provided in each of the information processing apparatus 104, the external server 102, and the printing apparatuses (the printers 101, 105) may form the information processing system of the present disclosure solely.

Also, in an example described in the above embodiments, in a case when a portion in an image is identified as an upsampling target, resolution conversion (increasing/decreasing pixel counts) is not performed on portions other than that portion. However, the present disclosure is not limited to this. In S4 in FIG. 6 (S45 in FIGS. 7A and 7B), S57 in FIG. 9, and S67 in FIG. 10, upsampling may be executed also on a portion other than the upsampling target portion such that the upsampling on the other portion increases pixels to a lesser degree than the upsampling on the upsampling target portion. Alternatively, downsampling may be executed on a portion other than the upsampling target portion.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method comprising:
obtaining image data representing an image laid out on a page;
setting an image region of an image as a target region on which to perform predetermined processing to change a pixel count and excluding an image region of an image that is filled in with one solid color as the target region; and
performing the predetermined processing on the target region in the image based on the setting set in the setting of a target region.

2. The information processing method according to claim 1, wherein the performing of the predetermined processing does not perform the predetermined processing on an image region in the image other than the target region.

3. The information processing method according to claim 1, wherein, as the predetermined processing, the performing of the predetermined processing performs upsampling on the target region in the image to increase the pixel count of the image.

4. The information processing method according to claim 1, wherein, as the predetermined processing, the performing of the predetermined processing performs downsampling on the target region in the image to decrease the pixel count of the image.

5. The information processing method according to claim 1, wherein the setting of a target region further includes analyzing a property of the image, and setting the target region based on a result of the analyzing.

6. The information processing method according to claim 5, wherein, in the setting, image region further subjected to bokeh processing or filter processing is set as the target region.

7. The information processing method according to claim 5, wherein, in the setting, an image region to be trimmed off is set as the target region.

8. The information processing method according to claim 1, wherein, in a case when, the image overlaps with a different image on the page, the setting of a target region includes identifying, in the image, an image region that overlaps with the different image based on the layout information and setting the target region based on the image region thus identified.

9. The information processing method according to claim 8, wherein the setting of a target region includes including the thus-identified image region in the target region and performing upsampling as the predetermined processing to increase a pixel count of the target region.

10. The information processing method according to claim 1, wherein the setting of a target region includes identifying, in the image, an image region that is located in a vicinity of a bound portion of a printed matter based on the layout information and setting the target region based on the image region thus identified.

11. The information processing method according to claim 1, wherein the setting of a target region includes identifying, in the image, an image region that is going to be cut off at a time of printing based on the layout information and setting the target region based on the image region thus identified.

12. The information processing method according to claim 1, wherein the setting of a target region includes identifying, in the image, an image region that is going to be printed on a print medium on which high-resolution printing is not possible at a time of printing, and setting the target region based on the image region thus identified.

13. The information processing method according to claim 1, wherein the performing of the predetermined processing performs the predetermined processing on the target region in the image based on the setting set in the setting step.

14. The information processing method according to claim 1, further comprising laying out the image on a page in an album, wherein the layout information pertains to a layout of the image on the page.

15. An information processing system comprising:
  at least one processor coupled to a memory storing instructions that, when executed by the at least one processor, causes the at least one processor to operate as:
    an obtaining unit that obtains image data representing an image laid out on a page;
    a setting unit that sets an image region of an image as a target region on which to perform predetermined processing to change a pixel count and that excludes an image region of an image that is filled in with one solid color as the target region; and
    an image processing unit that performs the predetermined processing on the target region in the image based on the setting set by the setting unit.

16. The information processing system according to claim 15, further comprising at least one of a printing apparatus that prints an image represented by image data, an information processing apparatus, and an external server communicatively connected to the information processing apparatus and the printing apparatus, wherein at least one of the printing apparatus, the information processing apparatus, and the external server functions as the obtaining unit, the setting unit, and the image processing unit.

17. The information processing system according to claim 16, wherein the information processing apparatus functions as the obtaining unit and the setting unit, and the printing apparatus functions as the image processing unit.

18. The information processing system according to claim 16, wherein the information processing apparatus functions as the obtaining unit and the setting unit, and the external server functions as the image processing unit.

19. A non-transitory computer readable storage medium storing a program for causing a computer included in an information processing system to perform an information processing method, the method comprising the steps of:
  obtaining image data representing an image laid out on a page;
  setting an image region of an image as a target region on which to perform predetermined processing to change a pixel count and excluding an image region of an image that is filled in with one solid color as the target region; and
  performing the predetermined processing on the target region in the image based on the setting set in the setting of a target region.

* * * * *